Patented May 25, 1937

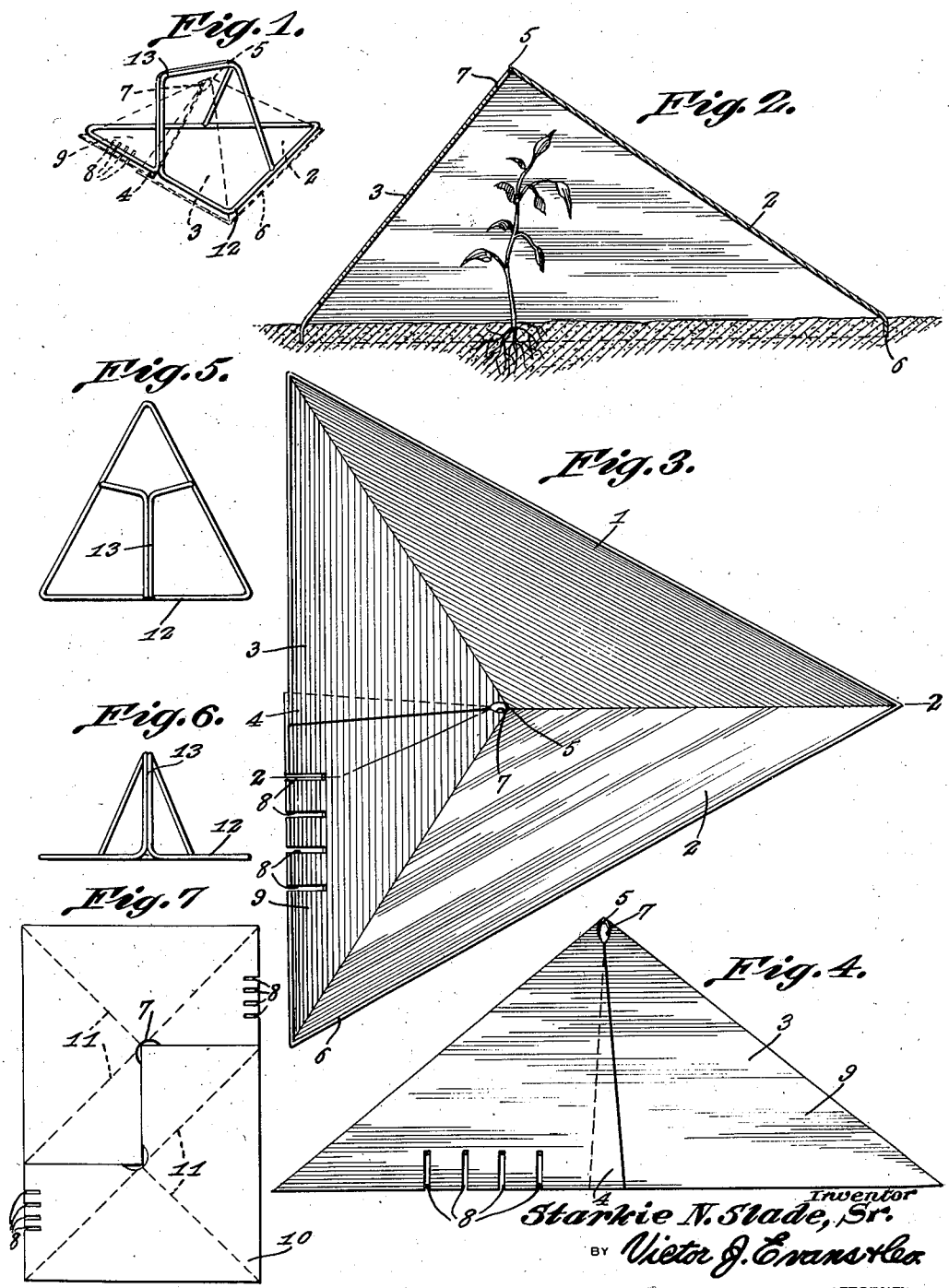

2,081,775

UNITED STATES PATENT OFFICE 2,081,775

PLANT PROTECTOR

Starkie N. Slade, Sr., Durham, N. C.

Application March 21, 1936, Serial No. 70,116

6 Claims. (Cl. 47—28)

This invention relates to plant protectors, and its general object is to provide a protector that is made from semi-transparent material such as waxed paper or the like of sufficient rigidity and in a shape to be self-supporting against inclement weather elements, and to afford ample protection against said elements, as well as detrimental heat, in that suitable ventilation is provided, which coupled with light admitted through the material and the retention of heat and moisture within the protector, will not only cause rapid sprouting of seeds, but will promote growth to a strong and healthy state and in a forced manner.

A further object of the invention is to provide a plant protector with ventilating openings so arranged that the heat is drawn from the ground to envelop the plant and thereby prevent chilling or freezing thereof, during cold periods.

Another object of the invention is to provide a device for setting and anchoring the protector in position for use, and which can be accomplished thereby with minimum effort in an easy and expeditious manner.

A still further object of the invention is to provide a protector and a setting device therefor, which is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a perspective view illustrating my plant protector setting device in use.

Figure 2 is a sectional view taken approximately on line 2—2 of Figure 3.

Figure 3 is a bottom plan view of the protector per se.

Figure 4 is a side view thereof.

Figure 5 is a top plan view of the setting device.

Figure 6 is a rear view thereof.

Figure 7 is a view illustrating the manner in which two protectors can be cut from a blank of material.

Referring to the drawing in detail, it will be noted that my plant protector or what I term a seed and plant forcer, is formed into a single piece and preferably from semi-transparent material such as waxed paper or the like. The protector is in the shape of a pyramid in that it includes three sloping walls, 1, 2 and 3, and the walls 1 and 2 are of the same shape and size, while the wall 3 is inclined or slopes to a greater degree than the walls 1 and 2, and is likewise formed into sections having overlapping portions 4 extending from the apex 5 to the lower edges of the sections, as best shown in Figure 3. The lower edge of the protector about the three walls thereof is preferably creased to provide a flange 6 for a purpose which will be later described.

The wall 3 at the juncture thereof with the apex 5 is provided with a substantially oval shaped opening 7 which is for a dual purpose, namely it acts as an exit for a plant when the latter has obtained a height for the passage thereof through the opening 7 and the latter also cooperates with slots 8 that are shown as being arranged in the section 9 of the wall 3, to provide suitable ventilating means for the protector, as will be apparent, as well as to have a tendency to create a partial vacuum within the protector for drawing heat from the ground. This action is accomplished by the wind or air currents passing over the opening 7 and the fact that the slots 8 are disposed adjacent to the ground. They are shown as extending through the lower edge of the wall 3 and rising therefrom. Any number of slots may be employed, it depending of course upon the size of the protector and that of the opening 7.

The overlapping edges of the sections of the wall 3 are preferably secured together by adhesive material, wax, or the like, but of course it is understood that any fastening means may be employed for that purpose.

In Figure 7 I have illustrated the manner in which two protectors may be cut from a single blank 10 of material in rectangular form, to eliminate waste. The protectors are preferably cut from the blank, the slots 8 made in one longitudinal edge thereof, thence the openings 7 are formed. When that action is completed, the cut portions are folded or creased on lines 11 to form the pyramid shape, as clearly shown in Figure 3.

It will be noted from Figure 2, that the protector is anchored in the soil or ground through the instrumentality of the flange 6, and in order to place the protectors in anchored position, I employ what I term a setting device that is made essentially from relatively heavy stiff wire and in a manner to include a triangle shaped base frame 12 of a size to fit the protector and contact the same adjacent its lower edge and preferably at the juncture of the flange 6 with the walls 1, 2 and 3, so that when the frame 12 is disposed within the soil it will carry the flange 6 therewith and embed the same within the soil accordingly. The setting device is preferably made from a single strand of wire bent to provide the base frame 12 and portions of the strand extend upwardly from midway the ends of one of the angle portions of the base frame 12 in contacting engagement with each other, as clearly shown in Figure 6, thence the portions are disposed at right angles with respect to the vertical portions to provide a handle 13, and from the handle the portions are disposed downwardly in diverging relation and are fixed to the other angle portions of the base frame, as clearly shown in Figure 5.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A plant protector comprising a hollow pyramidal shaped body formed from a single sheet of semi-transparent material, a flange depending from the lower edge of the body, and said body having an opening disposed adjacent the apex thereof and openings adjacent its lower edge for cooperation with each other to provide ventilation therefor.

2. A plant protector comprising a hollow pyramidal shaped body formed from a single sheet of material creased to provide sloping walls, a flange depending from the lower edge of the body for anchoring the protector in the ground for use, one of said walls including sections having overlapping edges secured together, and the sectional wall being provided with ventilating openings therein and arranged at the lower edge thereof and adjacent the apex of the body, respectively.

3. A plant protector comprising a hollow pyramidal shaped body having an opening adjacent the apex thereof and in one of its walls, said wall having slots extending from the lower edge thereof and cooperating with the openings for ventilating the body, and a flange extending about the lower edge of the body and depending therefrom.

4. A plant protector comprising a hollow pyramidal shaped body having ventilating openings therein, a flange depending from the lower edge of the body and means engageable with the flange for embedding the latter within the ground for anchoring the protector in position for use.

5. A plant protector comprising a hollow pyramidal shaped body, a flange depending from the lower edge thereof, and means including a base frame shaped to follow the flange for engagement therewith for embedding the latter within the ground for anchoring the protector in position for use, and handled means for the base frame.

6. A setting device for anchoring plant protectors within the ground and formed from a single strand of wire bent to provide a base frame shaped to follow the shape of the lower edge of the protectors and handled means rising from the base frame.

STARKIE N. SLADE, Sr.